United States Patent [19]

Viskochil

[11] 4,331,989
[45] May 25, 1982

[54] MAGNETIC DISC FILE HAVING DUAL LOCK MECHANISM

[75] Inventor: Stephen R. Viskochil, San Jose, Calif.

[73] Assignee: Priam Corporation, San Jose, Calif.

[21] Appl. No.: 149,972

[22] Filed: May 15, 1980

[51] Int. Cl.³ .................. G11B 19/22; G11B 17/00; G11B 25/04

[52] U.S. Cl. ................................. 360/97; 360/86; 360/98; 360/133; 369/268

[58] Field of Search ............... 360/137, 97–99, 360/86, 133; 369/232, 234, 235, 268, 237

[56] References Cited

U.S. PATENT DOCUMENTS

| | | | |
|---|---|---|---|
| 2,840,642 | 6/1958 | Camras | 360/86 |
| 3,803,358 | 4/1974 | Pedersen et al. | 369/268 |
| 3,940,148 | 2/1976 | Torrington et al. | 360/86 |
| 3,973,273 | 8/1976 | Lissner et al. | 360/98 |
| 4,135,721 | 1/1979 | Camerik | 369/268 |
| 4,139,874 | 2/1979 | Shiraishi | 360/86 |

Primary Examiner—Alfred H. Eddleman
Attorney, Agent, or Firm—Flehr, Hohbach, Test

[57] ABSTRACT

A dual lock mechanism for a magnetic disc drive whereby rotation of the disc spindle and translation of the carriage assembly can be prevented. A first lock arm is pivotally mounted whereby one end can engage the spindle drive motor. A connector link is operated in response to rotation of the first lock arm and pivots a second lock arm within the housing into engagement with the carriage assembly.

7 Claims, 3 Drawing Figures

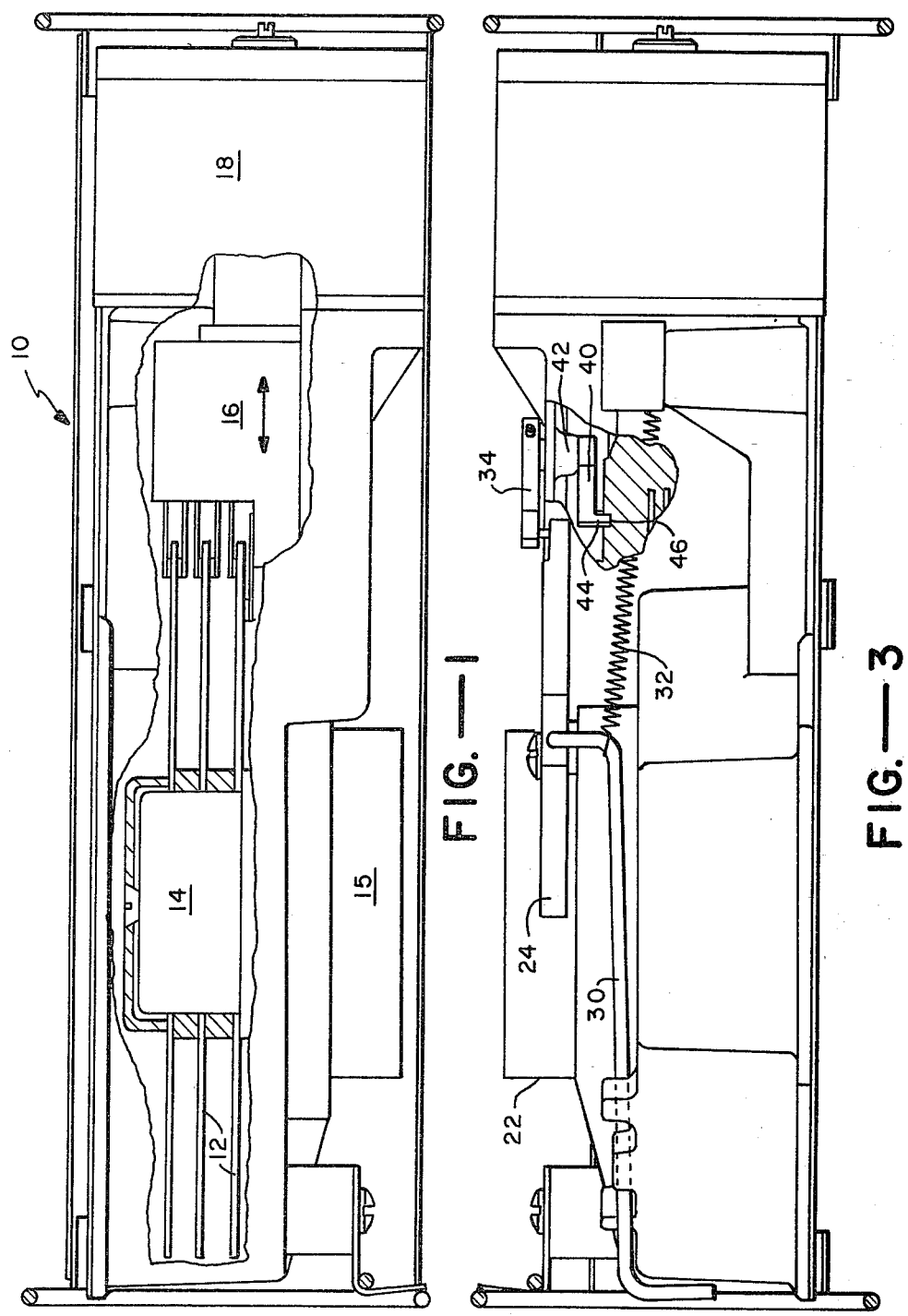

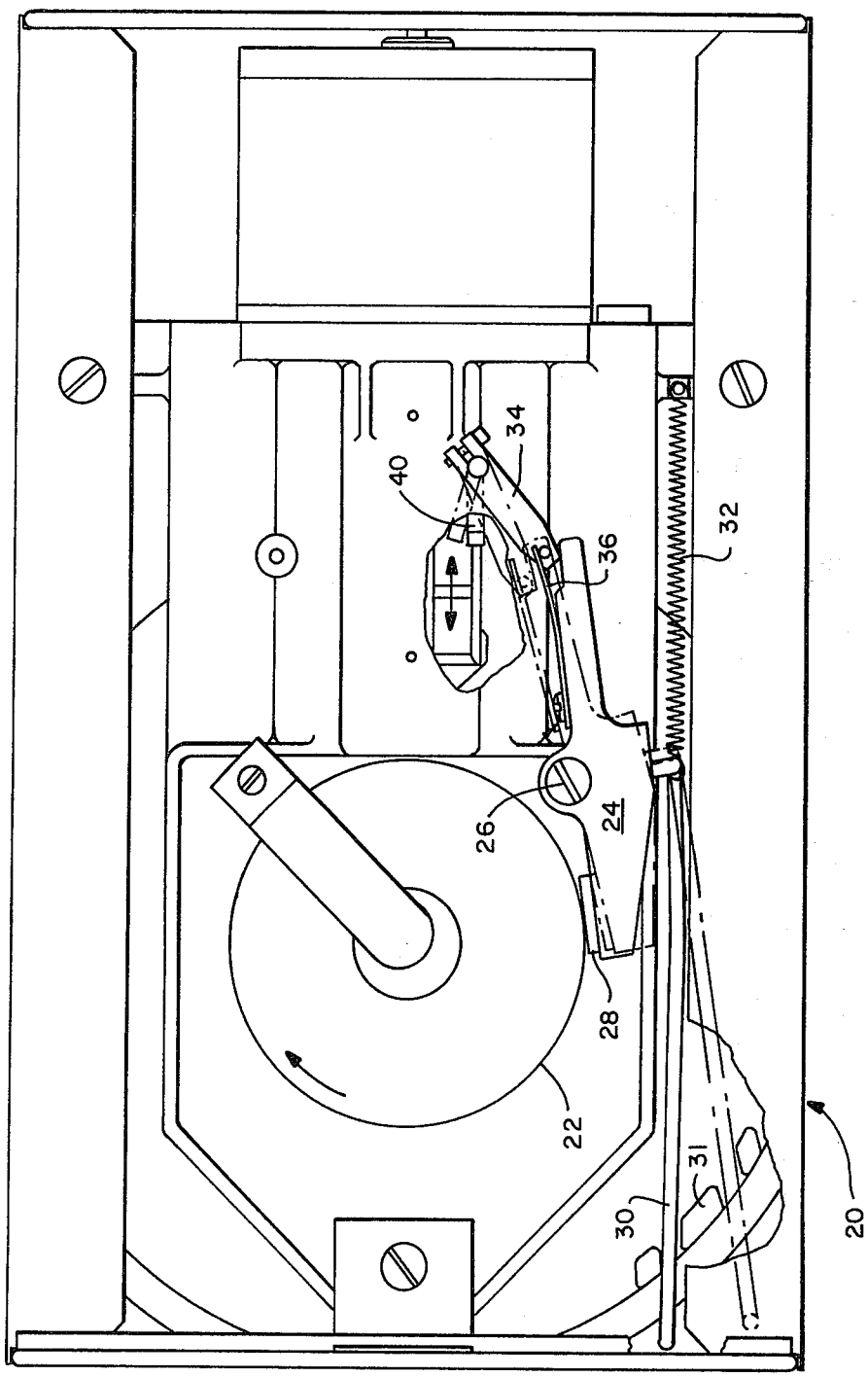
FIG.—2

MAGNETIC DISC FILE HAVING DUAL LOCK MECHANISM

This invention relates generally to magnetic disc drives, and more particularly the invention relates to a magnetic disc drive of the Winchester type which has a dual mechanical lock for the spindle and magnetic head carriage of the drive.

Disc drives having fixed memories and utilizing Winchester type magnetic heads have the heads in intimate contact with the discs when powered down and the discs are stationary. The head air bearing surface has a finish of one microinch (arithmetic average). Maximum deviation from the average is five microinches. The disc surface has a finish of 1.2 microinches with a maximum deviation of 12 microinches. Thus, to protect these extremely fine surfaces relative motion between the heads and the discs must be minimized when the heads are in contact with the discs.

Relative motion between the heads and discs, in the absence of any locking devices, can be caused by various outside disturbances. The two most disastrous situations are during shipment of the drive without any restraint on the carriage which can result in deep radial scratches across the disc, and failure to lock the spindle during drive installation or maintenance which allows the possibility of rotation of the disc opposite to the normal disc rotation and consequently resulting in deep circumferential scratches in the discs.

Accordingly, an object of the invention is a magnetic disc drive having means for locking the spindle and magnetic head carriage.

Another object of the invention is a dual mechanical lock which can be actuated by one mechanism.

Briefly, a lock for preventing rotation of the spindle motor and translation of the magnetic head carriage in a disc drive in accordance with the invention comprises a lock arm pivotally mounted on the bottom portion of the drive housing with one end of the lock arm including means for engaging the spindle motor. A manually operable lever is attached to one end of the first lock arm for pivoting the one end of the lock arm into engagement with the motor. A connector link has one end pivotally mounted in the bottom portion of the housing with the opposite end engaging an end of the first lock arm whereby rotation of the lock arm pivots the connector link. A second lock arm for engaging the carriage assembly is provided within the housing with means connecting the second lock arm to the connector link whereby pivoting of the connector link rotates the second lock arm into engagement with the carriage assembly when the first lock arm is pivoted into engagement with the motor.

The bottom portion of the housing preferably includes boss means for retaining the lever in a locked position and in an unlocked position with spring means yieldably biasing the lever in the boss means. A leaf spring is preferably attached to the first lock arm for yieldably biasing one end of the connector link into engagement with the lock arm. The carriage assembly preferably includes slot means with the second lock arm including a detent for engaging the lock means when the lever is in the locked position.

The invention and objects and features thereof will be more readily apparent from the following detailed description and appended claims when taken with the drawing, in which:

FIG. 1 is a side view of a disc drive shown partially in section to illustrate the enclosed disc and carriage assembly.

FIG. 2 is a plan view of the bottom surface of a disc drive in accordance with one embodiment of the present invention.

FIG. 3 is a side view of the disc drive of FIG. 2 with a portion thereof broken away to further illustrate the lock mechanism.

Referring now to the drawings, FIG. 1 is a side view of a magnetic disc drive 10 with a portion thereof removed to illustrate the enclosed discs 12 mounted on motor driven spindle 14 which is mounted through the bottom surface of the disc drive housing with the rotating motor housing 15 extending outside of the housing. A magnetic head carriage assembly 16 is linearly translated as indicated whereby data can be read or recorded on the surfaces of the magnetic discs 12 by means of magnetic pick-up heads.

As above indicated, serious damage can result to the magnetic discs when the drive is powered down if relative motion is permitted between the heads and discs. FIG. 2 is a bottom view of a disc drive having a dual lock mechanism for the spindle and carriage assembly in accordance with one embodiment of the present invention. The drive motor is mounted to the bottom surface with the rotating motor housing 22 extending outside of the bottom surface of the drive 20. A first lock arm 24 is pivotally mounted on the bottom surface of drive 20 by means of screw 26 with one end of the lock arm having a brake pad 28 for engagement with motor housing 22. Attached to the first lock arm 24 is a lever 30 which can be placed in a first position for locking housing 22 (as shown) and in a second position for unlocking the housing 22 (as shown in broken lines) as established by the boss 31. A spring 32 is attached to the housing of drive 20 and to lever 30 whereby lever 30 is yieldably biased in the lock and unlock positions of boss 31. To lock the carriage assembly and motor the locking lever must be raised over the center stop boss and forced over against the left stop boss on the base. To unlock the carriage assembly and spindle motor the locking lever must be raised over the center stop boss and returned over against the right stop boss on the base.

A connector link 34 is pivotally mounted through the bottom surface of drive 20 with one end of the connector link 34 engaging the first contact arm 24. In accordance with one feature of the invention the end of the connector link 34 is yieldably biased into engagement with the contact arm 24 by means of a leaf spring 36 which is attached to lock arm 24. Leaf spring 36 maintains normal physical engagement of link 34 and arm 24 but allows link 34 to yield and prevent possible internal damage in applying excessive force to lock the carriage, as will be described.

As shown in the side view of the disc drive of FIG. 3, a portion of the housing is removed to illustrate a second lock arm 40 which is attached to connector link 34 by a rod which extends through the bottom surface of the housing. Since the carriage lock mechanism penetrates the clean air chamber of the disc drive, the carriage assembly lock arm is actuated by rotary motion to reduce the possibility of contamination. A suitable seal 42 is provided to prevent particles or other contaminants from entering the housing. One end of the lock arm 40 is provided with a detent 44 which is rotatable into engagement with a slot 46 in the carriage assembly for locking the carriage.

In operation, the spindle and motor housing are free to rotate and the carriage assembly is free for lateral translation when lever 30 is placed in the unlocked position as shown in the phantom view of FIG. 2. In this position, the first lock arm 24 is pivoted with the pad 28 moved out of engagement with motor housing 22. The pivoting of contact arm 24 is translated through connector link 34 to the second lock arm 40 whereby the detent 44 is rotated out of contact with slot 46 in the carriage assembly.

When lever 34 is moved to the locked position (as shown by the solid lines in FIG. 2) the rotation of contact arm 24 forces brake pad 28 into engagement with motor housing 24. Preferably, the lever 30 is flexible and in moving the lever to the locked position the lever must be flexed resulting in a pressure engagement of pad 28 with the motor housing 22. The rotation of contact arm 24 is translated through connector link 34 to the lock arm 40 with the detent 44 rotating into engagement with slot 46 of the carriage assembly. Thus, in the locked position the spindle remains stationary due to the pressure engagement of brake pad 28, and the carriage assembly remains fixed due to the engagement of detent 44 of lock arm 40 in the slot 46 of the carriage assembly.

The dual lock mechanism in accordance with the invention is readily actuated by one lever. The actuator is easily reached and clearly visible to service personnel. While the mechanism has been illustrated as manually operated, a powered mechanism including a linear solenoid, for example, may be used. A fail safe mechanism can be incorporated in a powered device with sudden loss of power actuating the device to a locked position.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. In a disc file having a housing, a disc rotation motor mounted in the bottom portion of said housing, and a magnetic head carriage assembly mounted within said housing for linear translation, a lock for preventing rotation of said motor and translation of said carriage assembly comprising a first lock arm pivotally mounted on the bottom portion of said housing, one end of said lock arm including means for engaging said motor, an operable lever attached to said lock arm for pivoting said one end into engagement with said motor, a connector link having one end pivotably mounted through said bottom portion and the opposite end engaging an end of said first lock arm whereby rotation of said first lock arm pivots said connector link, a second lock arm for said carriage assembly within said housing, and means connecting said second lock arm to said connector link whereby pivoting of said connector link rotates said second lock arm into engagement with said carriage assembly when said first lock arm is pivoted into engagement with said motor.

2. A lock as defined by claim 1 and further including a brake pad attached to one end of said first lock arm for engaging said motor.

3. A lock as defined by claim 2 wherein said lever is flexible and said lever is flexed in the locked position whereby said first lock arm is maintained in pressure engagement with said motor.

4. A lock as defined by claim 1 and further including boss means in said housing for retaining said lever in a locked position and in an unlocked position, and spring means for yieldably biasing said lever in said locked and unlocked positions.

5. A lock as defined by claim 1 and further including leaf spring means attached to said first lock arm and yieldably biasing said connector link into engagement with said lock arm.

6. A lock as defined by claim 1 wherein said carriage assembly includes slot means and said second lock arm includes a detent for engaging said slot means.

7. A lock as defined by claim 1 wherein said lever is manually operated.

* * * * *